United States Patent [19]

Gasparian

[11] Patent Number: 4,961,801
[45] Date of Patent: Oct. 9, 1990

[54] METHOD OF MAKING A BIDIRECTIONAL COUPLER FOR COMMUNICATION OVER SINGLE FIBER

[75] Inventor: George A. Gasparian, Roanoke, Va.

[73] Assignee: Alcatel U.S.A. Corp., New York, N.Y.

[21] Appl. No.: 608,610

[22] Filed: May 9, 1984

Related U.S. Application Data

[60] Division of Ser. No. 494,135, May 16, 1983, Pat. No. 4,452,505, which is a continuation of Ser. No. 136,636, Apr. 2, 1980, abandoned.

[51] Int. Cl.$^5$ .............................................. B32B 31/22
[52] U.S. Cl. ...................................... 156/153; 156/256; 350/96.15
[58] Field of Search ............... 350/96.15, 96.16, 96.18, 350/96.19; 156/99, 153–154, 176, 296, 256

[56] References Cited

U.S. PATENT DOCUMENTS

| | | | |
|---|---|---|---|
| 3,970,360 | 7/1976 | Kersten et al. | 350/96.15 |
| 4,057,319 | 11/1977 | Ash et al. | 350/96.19 |
| 4,234,969 | 11/1980 | Singh | 350/96.16 |
| 4,339,170 | 7/1982 | Winzer | 350/96.18 |
| 4,351,585 | 9/1982 | Winzer et al. | 350/96.15 |
| 4,373,775 | 2/1983 | Gasparian | 350/96.15 |

Primary Examiner—Merrell C. Cashion, Jr.
Attorney, Agent, or Firm—Christie, Parker & Hale

[57] ABSTRACT

An assembly for bidirectional signal transmission over a single fiber is disclosed together with its method of manufacture. A hot coating of dichoric material is applied to a surface of a glass substrate. The substrate is processed into dichoric wafers having larger dimensions than the cross section of the fiber with which it is employed. The dichroic wafer is positioned over the end face of a polished fiber beamsplitter and secured thereto by a thin layer of optical grade epoxy. A second polished fiber beamsplitter may then be secured in a similar manner to the opposite side of the wafer. The coated wafer forms an acute angle of about 25° with a plan perpendicular to the axis of each beamsplitter half. A bidirectional coupler is thereby formed.

17 Claims, 1 Drawing Sheet

Grind & Polish Apparatus

METHOD OF MAKING A BIDIRECTIONAL COUPLER FOR COMMUNICATION OVER SINGLE FIBER

The Government has rights in this invention pursuant to Contract No. DAAB0777-C-1798 awarded by the Department of the Army.

This application is a division of application Ser. No. 494,135 filed May 16, 1983, now U.S. Pat. No. 4,452,505 which, application is a continuation of application Ser. No. 136,636 filed Apr. 2, 1980 and now abandoned.

BACKGROUND OF THE INVENTION

The field of the invention relates to bidirectional signal transmission over a single filter utilizing wavelength duplexing.

There are many instances where duplex communication is desirable over a single optical fiber. Dichroic filters have typically been used in conjunction with the fibers to distinguish between two wavelengths.

A "cold" dichroic coating has been directly applied to an end face of an optical fiber. This application is often characterized by poor adhesion of the coating. A "hot" coating is generally preferred over a "cold" coating because of its increased adhesion and durability. The preferred method has been impractical, however, due to the different thermal expansion coefficients between the fiber, the epoxy holding the fiber to its substrate, and the substrate. As the coated end face is cooled, the multi-layer dielectric dichroic coating usually becomes detached or the adhesion becomes so weakened causing it to become detached at a later time. The survival rate is small which results in both wasted time and material. "Cold" coatings typically have poor adhesion characteristics and are not as durable as "hot" coating. Both "hot" and "cold" MLD i.e., dichroic coatings have been examined.

Although a "cold" multi-layer dielectric dichroic coating can be applied to the fiber end face, the adhesion and durability is poor. Accordingly the dichroic surfaces often do not survive the alignment process.

SUMMARY OF THE INVENTION

It is an object of the invention to provide an optical fiber with a dichroic filter such that the disadvantages inherent with prior art methods are avoided.

The dichroic filter provided by the invention is a bulk surface device which is extremely thin, e.g., less than about 50–75 micrometers. A glass substrate, typically fused silica-SiO$_2$ is provided. A multi-layer dielectric dichroic coating (hot) is applied to the glass substrate. The dichroic filter is ground and polished to a nominal thickness. Its dichroic surface is protected during the grinding and polishing operation.

The bulk sample is then diced into either square or rectangular wafers on a diamond saw. The wafer size is variable, but it must be larger than the fiber to which it is ultimately applied. A nominal cross section of two millimeters by two millimeters can be employed. The dichroic wafer is positioned over a polished fiber beamsplitter half. A thin layer (less than 25 micrometers) of optical epoxy is applied to the fiber beamsplitter half. The dichroic wafer is then directly attached by means of the epoxy to the half. It is important that the epoxy layer be quite thin such that axial displacement is small. Otherwise coupling loss will increase. This coupler half is cured according to the cure properties of the epoxy.

A second uncoated fiber beamsplitter may be micromanipulated with epoxy on its surface and brought into contact with a dichroic beamsplitter half. The two parts are positioned for maximum signal throughput. The completed device is cured and removed from the assembly station. Transmission and reflectivity measurements are performed to characterize the dichroic coupler.

DETAILED DESCRIPTION OF THE INVENTION

The invention provides a means for applying a dichroic surface directly to a fiber end face without the usual difficulties associated with previously known methods.

Figure 1:
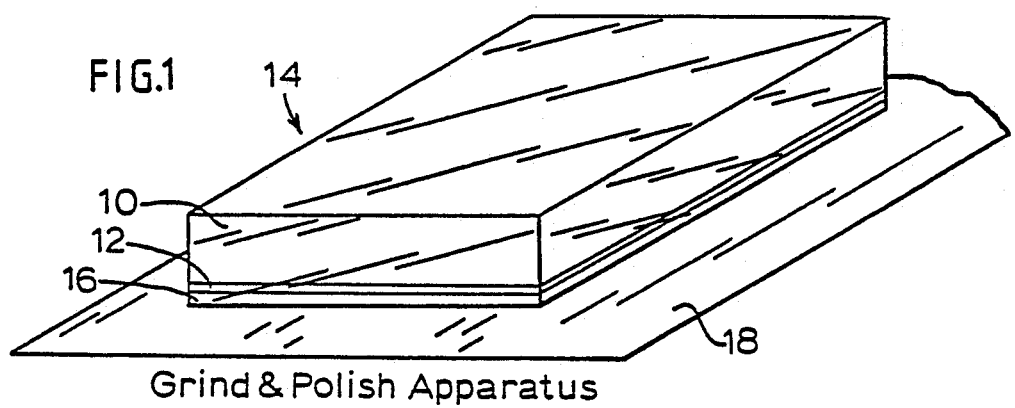
FIG. 1 is a perspective view of a glass substrate having a multi-layer dielectric dichroic coating thereon.

Referring to the drawings, a glass substrate 10 is provided having a thickness of about 125 to 150 micrometers. The substrate may be fused silica-SiO$_2$. A multi-layer dielectric dichroic coating 12 is applied to one of the large faces of the glass substrate 10. The substrate may be in the form of a rectangular slab as shown in FIG. 1 or may alternatively take other forms. A "hot" coating of the multi-layer dielectric dichroic material is applied to enhance adhesion and durability. A dichroic filter 14 is thereby formed.

After deposition of the coating, the dichroic filter 14 is ground and polished to a nominal thickness. The dichroic surface 12 is protected during the grinding and polishing step. This protection is achieved by applying a soluble adhesive 16 thereto which will not harm the dichroic coating. The filter 14 is placed upon a grinding and polishing apparatus 18 as shown in FIG. 1. The dichroic filter 14 is then diced into a plurality of square or rectangular wafers by a diamond saw. The wafer size is variable, but it must have larger dimensions than the cross section of the fiber with which it is employed. A representative cross section of two millimeters by two millimeters can be utilized.

Figure 2:
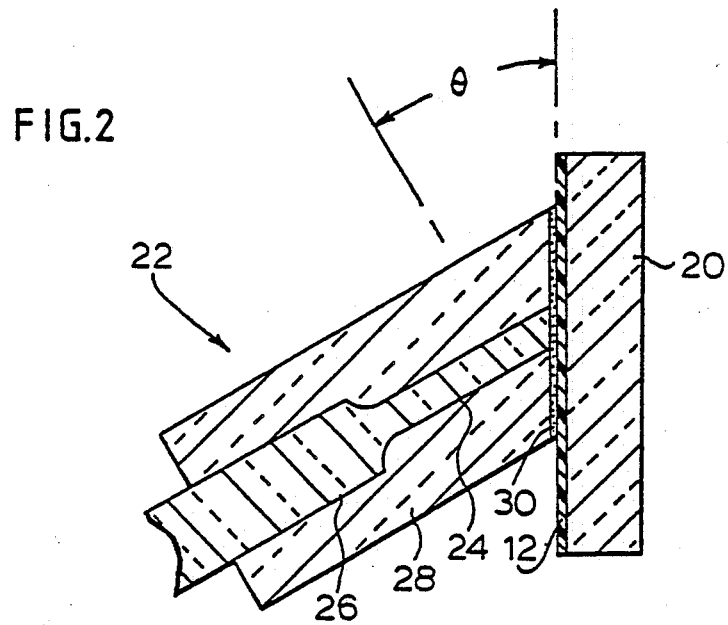
FIG. 2 is a sectional elevational view of a dichroic wafer secured to a fiber beamsplitter half.

Referring now to FIG. 2, the dichroic wafer 20 is positioned over a polished fiber beamsplitter half 22. The fiber beamsplitter half 22 includes a portion including a bare optical fiber 24 and another portion including the fiber with a jacket of fiber cladding material 26. Both portions are contained within a glass substrate 28. A thin layer 30 of optical grade epoxy is applied to the end face of the fiber beamsplitter half. The layer should be less than 25 micrometers in thickness to minimize coupler transmission loss due to axial separation of the fibers. The dichroic wafer is then directly attached to the fiber beamsplitter half by the layer 30 of epoxy. In the embodiment shown in FIG. 2, the wafer forms an acute angle $\theta$ with a plane perpendicular to the axis of the beamsplitter half of about 25°. This incident angle is critical for optimum optical performance of the fiber dichroic coupler An acute angle of 25° is selected such that the polarization effects, i.e., Brewster's angle, are not approached (incident acute angle plus finite half angle of the fiber). Brewster's angle for the fiber core/e- poxy interface is about 43°. The fiber half angle is about 8°; thus, a portion of the reflected beam will have an angle of about 35°. This is below the polarization angle and will allow good performance of the dichroic coating.

Figure 3:
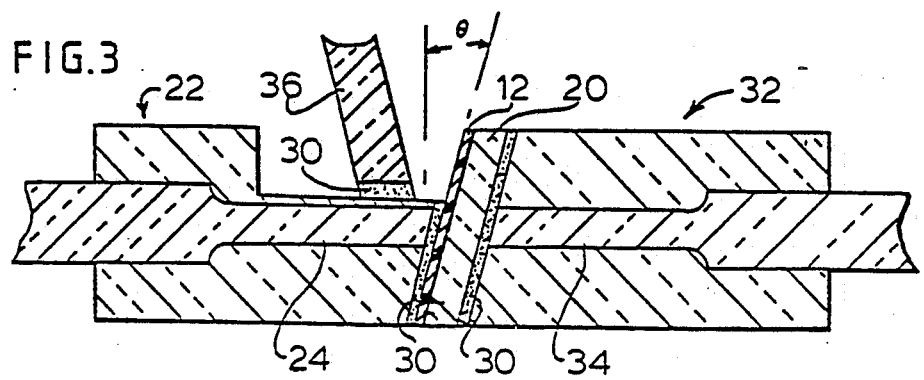
FIG. 3 is similar to FIG. 2 and further includes a second uncoated fiber beamsplitter half secured to the opposite side of the wafer. Additionally, a third port tapoff fiber or light pipe is bonded to the coupler using optical grade epoxy.

A second uncoated fiber beamsplitter half 32 is micropositioned with respect to the first fiber beamsplitter half 22 to maximize signal throughput. It is secured to the opposite side of the dichroic wafer 20 by means of a thin layer 30 of optical grade epoxy. The fiber 34 within the second half has substantially the same diameter as that in the first half 18. The coupler shown in FIG. 3 is thereby obtained wherein the fibers are aligned. Additionally, either a tapoff fiber or light pipe 36 is aligned and epoxied to the substrate 28 near the wafer 20. Maximum tapoff efficiency is accordingly achieved as reflected light is collected for processing.

It has been found that the bidirectional coupler produced according to the invention is sufficiently durable for practical use in duplex communication. The polished dichroic wafer 20 shown in the figures is approximately between less than 50 and 75 micrometers in thickness with a cross section of two millimeters by two millimeters. It will be appreciated, however, that alternative dimensions are also possible. It has also been found that coupling efficiency is quite acceptable provided the axial separation of the fibers 24, 34 is within two fibers diameters for chemical vapor deposition type fibers, and an optical epoxy is the interaction medium.

Once the coupler is assembled, it is cured and removed from the assembly station. Transmission and reflectivity measurements are performed to characterize the dichroic coupler.

Those skilled in the art will appreciate that modifications can be made in the above described structure without materially departing from the spirit of the invention. Accordingly, the scope of the invention should be determined by reference to the appended claims.

What is claimed is:

1. A method for producing a bidirectional coupler for duplex communication over a single optical fiber comprising the steps of:
   providing a glass substrate;
   applying a dichroic coating upon a surface of said substrate;
   processing said coated substrate into at least one dichroic wafer so that said surface is larger in area than the cross-sectional area of the optical fiber; and
   attaching an optical fiber to said surface by means of an adhesive.

2. A method as described in claim 1 wherein a hot coating of dichroic material is applied to said substrate.

3. A method as described in claim 1 wherein said wafer is formed to be less than 75 μm in thickness.

4. A method as described in claim 1 wherein said processing includes dicing said substrate into a plurality of dichroic wafers.

5. A method as described in claim 1 including the steps of providing a second optical fiber and attaching said second optical fiber to a side of said wafer opposite from where the other optical fiber is attached, both fibers being secured to said wafer by means of a thin layer of optical grade epoxy.

6. A method as described in claim 1 wherein said glass substrate is fused silica-$SiO_2$.

7. A method as described in claim 1 including the steps of polishing and grinding said substrate after applying the dichroic coating.

8. A method as described in claim 1 wherein said wafer is attached to said optical fiber by means of a thin layer of optical grade epoxy.

9. A method as described in claim 1 including the step of attaching said wafer to said optical fiber at such an angle with respect to a plane perpendicular to the axis of said fiber such that polarization effects are not approached.

10. A method as described in claim 9 wherein said angle is about 25°.

11. A method as described in claim 9 wherein both fibers are attached to said wafer at such angles with respect to planes perpendicular to the axes of said fibers that polarization effects are not approached.

12. A method as described in claim 11 wherein said angles are about 25°.

13. A method as described in claim 5 including the step of bonding a tapoff fiber to said coupler near said wafer to collect reflected light for processing.

14. A method as described in claim 11 including the step of bonding a tapoff fiber to said coupler near said wafer to collect reflected light for processing.

15. A method as described in claim 12 including the step of bonding a tapoff fiber to said coupler near said wafer to collect reflected light for processing.

16. A method for producing an optical coupler, comprising the steps of:
    providing optical transmission means for transmitting light and providing a thin glass wafer including opposite surfaces each having a larger area than the cross-sectional area of the optical transmission means;
    applying a dichroic coating on one of said surfaces; and
    attaching the optical transmission means on said one of said surfaces by use of an adhesive.

17. A method as described in claim 16 further comprising the step of attaching a second optical transmission means on the other of said surfaces by use of an adhesive so that said optical transmission means are aligned.

* * * * *

UNITED STATES PATENT AND TRADEMARK OFFICE
CERTIFICATE OF CORRECTION

PATENT NO. : 4,961,801
DATED : October 9, 1990
INVENTOR(S) : George A. Gasparian It is certified that error appears in the above-identified patent and that said Letters Patent is hereby corrected as shown below:

On the Front Page:

Abstract, lines 3,5, change "dichoric" to -- dichroic -- (both occurrences).

Column 1, line 16, after "single" and before "utilizing" change "filter" to -- fiber --.

Column 3, line 29, change "two fibers" to -- two-fiber --.

Signed and Sealed this

Twenty-eighth Day of April, 1992

Attest:

HARRY F. MANBECK, JR.

*Attesting Officer*  *Commissioner of Patents and Trademarks*